(12) United States Patent
Hong

(10) Patent No.: US 9,254,768 B2
(45) Date of Patent: Feb. 9, 2016

(54) LUMBAR SUPPORT OF CAR SEAT

(71) Applicant: Chun Yoo Hong, Seoul (KR)

(72) Inventor: Chun Yoo Hong, Seoul (KR)

( * ) Notice: Subject to any disclaimer, the term of this patent is extended or adjusted under 35 U.S.C. 154(b) by 44 days.

(21) Appl. No.: 14/205,511

(22) Filed: Mar. 12, 2014

(65) Prior Publication Data

US 2015/0091349 A1 Apr. 2, 2015

(30) Foreign Application Priority Data

Oct. 2, 2013 (KR) .................. 10-2013-0118114

(51) Int. Cl.
*A47C 7/46* (2006.01)
*B60N 2/66* (2006.01)

(52) U.S. Cl.
CPC .............. *B60N 2/666* (2015.04); *B60N 2/6671* (2015.04); *B60N 2/6673* (2015.04); *A47C 7/46* (2013.01); *B60N 2/66* (2013.01)

(58) Field of Classification Search
CPC .................................... B60N 2/66; A47C 7/46
USPC ..................... 297/284.1, 284.4, 284.7, 284.8
See application file for complete search history.

(56) References Cited

U.S. PATENT DOCUMENTS

| 5,462,335 A * | 10/1995 | Seyler ................... 297/284.4 |
| 2006/0244293 A1 * | 11/2006 | Buffa .................... 297/284.4 |
| 2010/0301650 A1 | 12/2010 | Hong |

FOREIGN PATENT DOCUMENTS

| KR | 10-0781018 | 11/2007 |
| KR | 10-1122980 | 3/2010 |
| KR | 10-1085154 | 11/2011 |

* cited by examiner

*Primary Examiner* — Syed A Islam
(74) *Attorney, Agent, or Firm* — Anderson Gorecki & Rouille LLP

(57) ABSTRACT

A lumbar support of a car seat according to the present invention includes: a support plate to support user's back and made of elastic material; a support frame to which the support plate is rotatably engaged; a slider member mounted on the support frame in a movable manner in a vertical direction; a vertically driving means to move the slider member on the support frame; a biasing force control means including an upper member moving together with the slider member, a lower member disposed below the upper member, a biasing member connecting the upper and lower members to each other and having a controllable biasing force acting on the support plate depending on a distance between the upper and lower members, and an actuating means to control the distance between the upper member and the lower member.

10 Claims, 6 Drawing Sheets

LUMBAR SUPPORT OF CAR SEAT

BACKGROUND OF THE INVENTION

1. Field of the Invention

The present invention relates to a lumbar support of a car seat.

2. Description of the Related Art

In general, a car seat is to be provided so as to safely and comfortably support a passenger in the limited space of the vehicle room and in a limited range of weight. Therefore, the car seat includes a seat back having a seat back frame and a seat back pad so as to support the waist and back portions of a driver or a passenger, wherein the driver and a passenger who seat in the front seats can control the angles of the seat backs by pulling or pushing the same forwards or backwards according to the driving habit of the driver or the body conditions of the driver or the passenger.

However, there are difficulties to respond to the change of the seating posture of the driver or the passenger just by the seat back frame and the seat back pad in the case of long time driving. Therefore, a lumbar support is provided in the seat back so as to comfortably surround and support the back and the lumbar vertebra regions of the driver, wherein the lumbar support includes a support plate which comes in contact with the lumbar vertebra region of the driver and a controller for controlling the movement of the support plate.

PRIOR ART DOCUMENT

Patent Documents

Korean Reg. Patent Publication No. 10-1122980—Lumbar support of a car seat, registered on 24 Feb. 2012

Korean Reg. Patent Publication No. 10-1085154—Actuator system for controlling a lumbar support, registered on 14 Nov. 2011

Korean Reg. Patent Publication No. 10-0781018—Lumbar support system for a vehicle, registered on 23 Nov. 2007

SUMMARY OF THE INVENTION

In view of the prior art with respect to the lumbar support as above, a lumbar support as disclosed in Korean Reg. Patent Publication No. 10-1122980 comprises a pair of coupling means to be coupled to traversal fixing bars which are provided to the upper and lower portions in a seat back, a pair of support plates, each having a plurality of support wings provided at both right and left sides between the coupling means and the coupling means, a support member formed at the lower portions of the support plates and having a sacral region, and a support height control means for steplessly controlling the protruding height of the support plates which can selectively protrude to be curved at one side portion of each of the support plates, wherein a lumbar vertebra region is further provided to be integrated into the sacral region of the support member.

The prior art lumbar support as above can differ the bending degree of the support plate by manually operating a rotary lever which is mounted on the side wall portion of the seat. However, for the promotion of the convenience of a driver, the bending degree control by any other method rather than the inconvenient manual operation of the rotary lever has been required.

As a prior art for resolving the inconvenience of the manual operation and providing automatic controlling of the lumbar support, Korean Reg. Patent Publication No. 10-1085154 discloses a technique, wherein a deceleration part includes a worm, a worm gear and a screw so as to connect a wire of which one end is fixed to a lumbar support to a driving motor such that a slider which is screw-coupled to the screw moves in a housing by the operation of the deceleration part so as to pull or push the wire, thereby controlling the bending degree of support plates.

However, the prior art as above still has a problem that the wire snaps due to the load which is continuously applied thereto even though the bending degree can be controlled using the wire which is fixed at the upper and lower portions of the support plates.

The present invention is derived in consideration of the problems and disadvantages of the prior art and has an objective to provide a lumbar support of a car seat, of which bending degree can be automatically controlled by power while stably pressing support plates so as to improve the safety of the product.

In order to achieve the above and any other objectives of the present invention, provided is a lumbar support of a car seat, comprising: support plates made from a synthetic resin material in the shape of a plate and having a plurality of support wings at both sides and fixing hooks on top of the rear surface thereof; support frame positioned at the rear portions of the support plates and having a support rod engaged with the fixing hooks and a pair of guide rods connected to the support rod in parallel to each other; slider member provided to move in the vertical direction by the guide of the guide rods and having a spiral hole formed in the center thereof; vertically driving means having a driving motor driven by an external input signal and a screw which is coupled in the spiral hole of the slider member so as to move the slider member by the operation of the driving motor; and a biasing force control means positioned between the support plates and the support frame and controlling the pressing degree of the support plates according to the operation of a user, wherein the biasing force control means includes; an upper member coupled to the slider member; a lower member guided to move in contact with the guide rods of the support frame; and coil springs having both end portions which are respectively fitted and fixed into the upper member and the lower member and a shaft fitted into a coil portion in the center thereof; wherein a wire which passes through an insertion hole of the lower member so as to be held by the upper member is pulled and released by an actuator such that the central coil portion of the coil springs presses the support plates.

According to another aspect of the present invention, the rollers may be mounted on the shaft by being fitted between the coil springs at both sides of the shaft.

Further, hinge parts may be formed at both end portions of the slider member so as to surround the hinge shafts which are formed at both ends of the upper member, and guide protrusions may be respectively formed by protruding from the both sides of the lower member so as to prevent the movement of the lower member in the right and left directions when the lower member moves in the vertical direction along the guide of the guide rods.

According to another aspect of the present invention, provided is a lumbar support of a car seat comprising: a support plate to support user's back and made of elastic material; a support frame to which the support plate is rotatably engaged; a slider member mounted on the support frame in a movable manner in a vertical direction; a vertically driving means to move the slider member on the support frame; a biasing force control means including an upper member moving together with the slider member, a lower member disposed below the upper member, a biasing member connecting the upper and lower members to each other and having a controllable biasing force acting on the support plate depending on a distance between the upper and lower members, and an actuating means to control the distance between the upper member and the lower member.

Here, fixing hooks may be formed in one end of the support plate which is hingedly engaged to the support frame.

Further, the support frame may include: a supporting member to which the fixing hooks are engaged; and a pair of guides rod fixed to the supporting member.

Further, the slider member may be guided by a pair of guide rods provided to the support frame, and the vertically driving means is fixed to the support frame.

Here, the vertically driving means may include: a driving motor; a screw driven by the driving motor and engaged with the slider member via a threaded hole formed in the slider member.

Further, each end of the biasing member may be respectively engaged to the upper member and the lower member.

Here, the biasing member may be configured to be protruded toward the support plate as the distance between the upper member and the lower member decreases.

Here, the biasing member may include: coil springs extended between the upper member and the lower member; and a shaft inserted into the coil springs.

Here, the biasing member may include a pair of coil springs and the shaft inserted into both of the pair of coil springs.

Here, the actuating means may include: a wire engaged to the upper member through the lower member; and an actuator pulling or releasing the wire such that the central coil portion of the coil springs presses the support plate.

According to the present invention in the above structure, the central coil portion presses the support plates by coming in or out by the operation for decreasing or increasing a distance between the upper member 50 and the lower member 60 which are coupled to the both ends of the coil springs 70. Therefore, the pressing operation can be smoothly carried out.

Further, the pressing portion which comes in contact with the support plates is pressed in the coil portion which is positioned in the center of the coil springs 70. Therefore, the support plates which supports a human body is applied with elasticity even in the case of collisions or the like during driving. Therefore, it is possible to more safely protect a driver.

Figure 1:
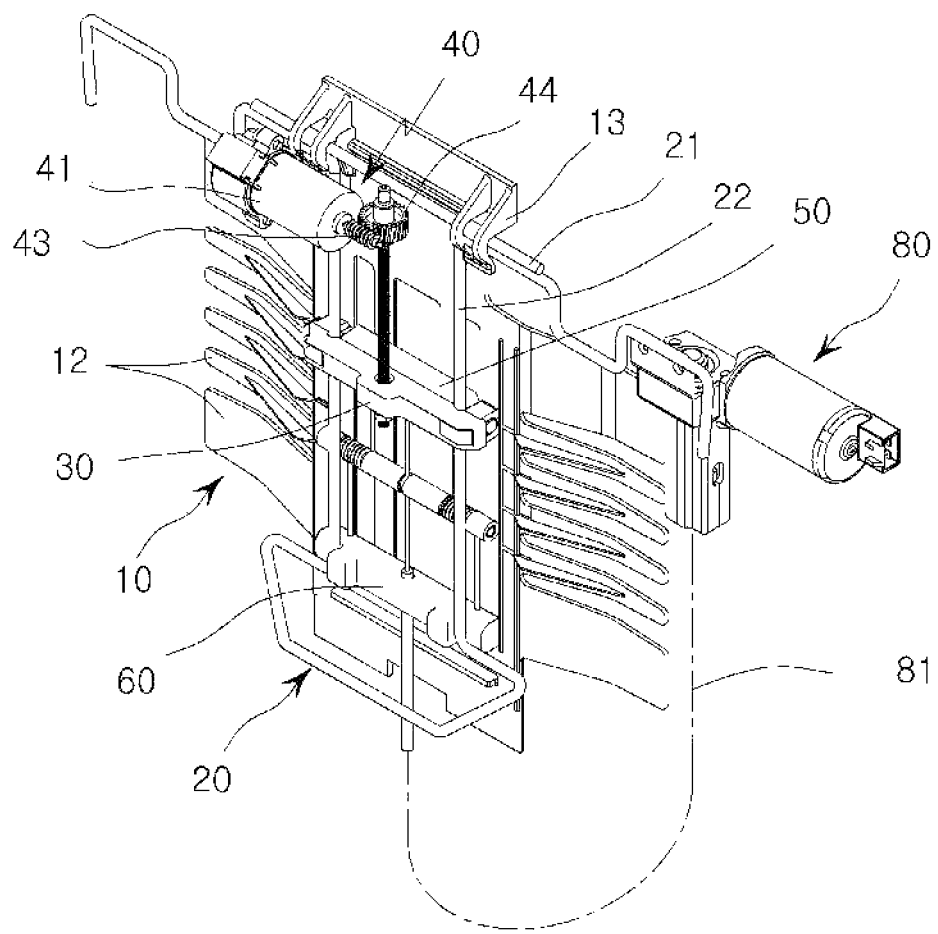
FIG. 1 is a perspective view showing the entire configuration of a lumbar support according to an embodiment of the present invention.
Figure 2:
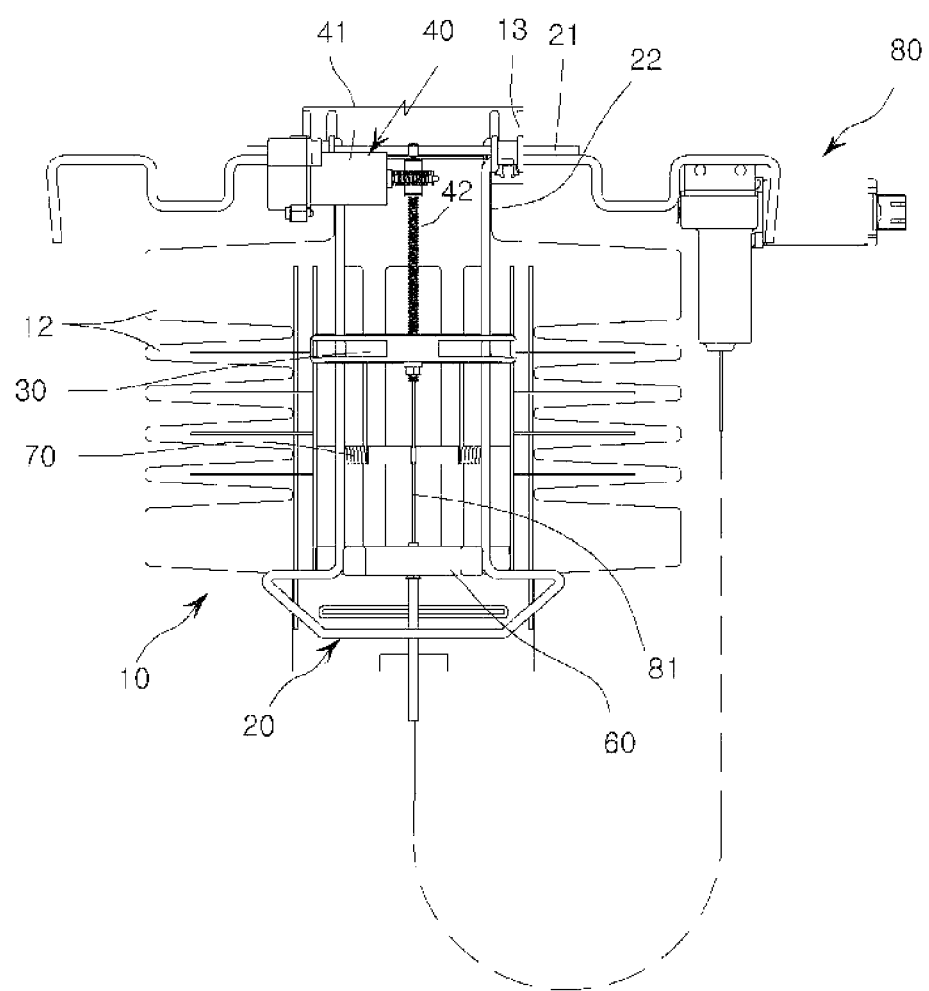
FIG. 2 is a front view of the lumbar support of FIG. 1.
Figure 3:
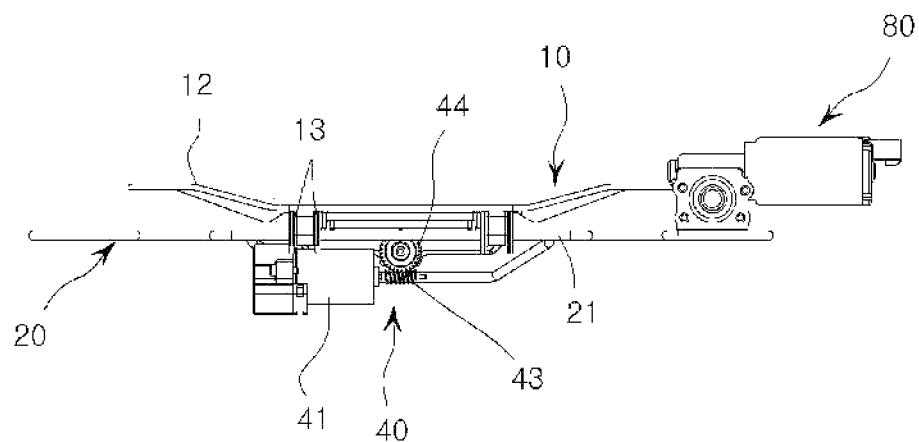
FIG. 3 is a plane view of the lumbar support of FIG. 1.
Figure 4:
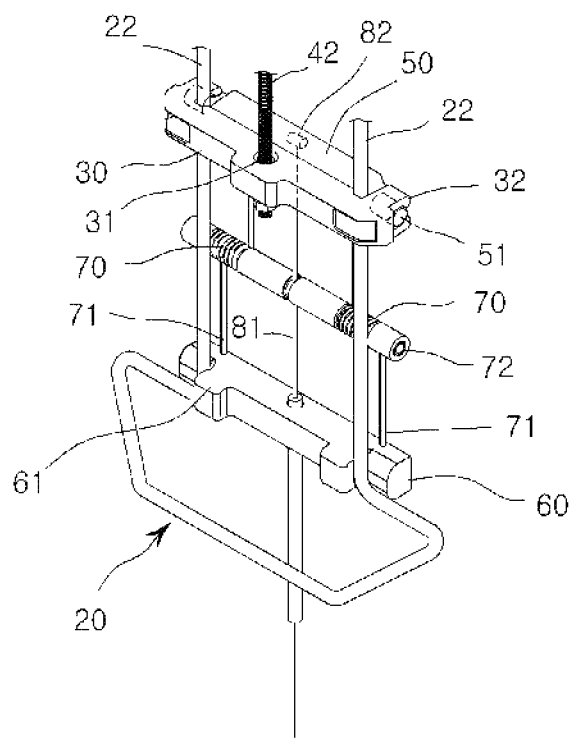
FIG. 4 is a perspective view showing the principal construction of a pressing device which presses support plates according to the present invention.
Figure 5:
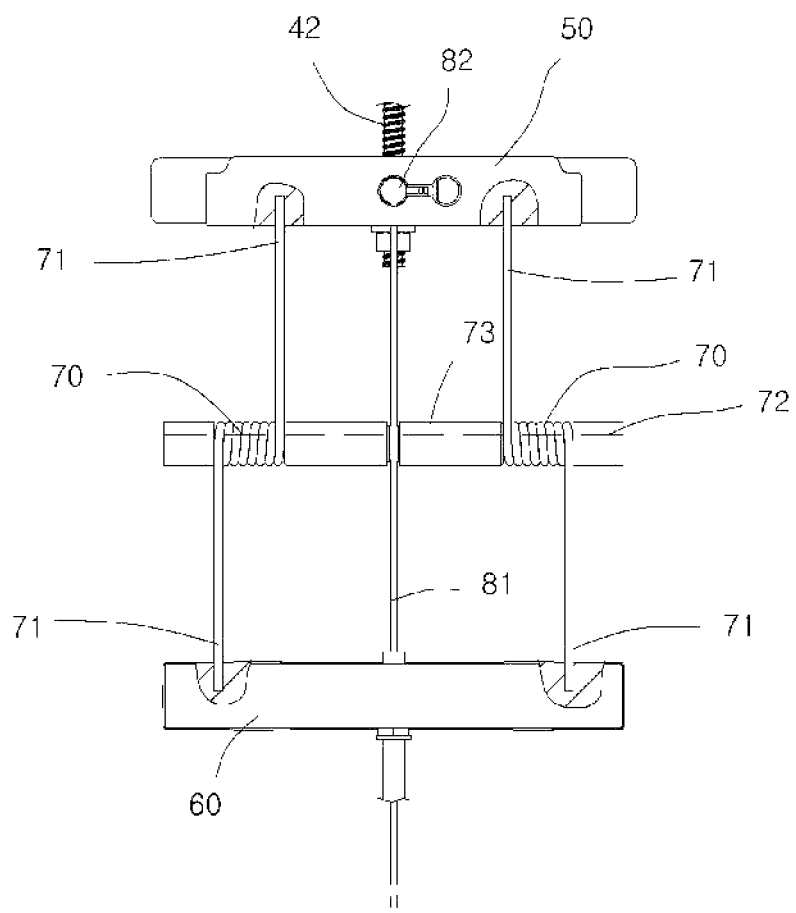
FIG. 5 is a rear view showing the principal construction of the pressing device according to the present invention.

| Brief Description of Reference Numerals | |
|---|---|
| 10 - support plate | 12 - support wings |
| 20 - support frame | 22 - guide rods |
| 30 - slider member | 31 - spiral hole |
| 32 - hinge parts | 40 - vertically driving means |
| 41 - driving motor | 42 - screw |
| 50 - upper member | 51 - hinge shafts |
| 60 - lower member | 61 - guide protrusions |
| 70 - coil springs | 72 - shaft |
| 80 - actuator | 81 - wire |

DETAILED DESCRIPTION OF THE PREFERRED EMBODIMENTS

Hereinafter, the present invention will be described in greater detail by reference to the drawings. However, the present invention should not be construed as being limited thereto.

Now, the configuration of the present invention to achieve the above objective will be described.

According to the present invention, a lumbar support of a car seat is provided in a seat back and controlled to move forwards or backwards with respect to the lumbar vertebra region of a passenger by power so as to support the lumbar vertebra region of a passenger such that the contact and comfort of a passenger in a seat can be improved and an overload is prevented from being applied to the lumbar region of the passenger due to the improper seating posture of the passenger.

A lumbar support according to the present invention mainly includes support plates 10 in the shape of a general plate, a support frame 20 formed of a support rod 21 and a pair of guide rods 22 which are in parallel to each other and connected to the support rod 21, a slider member 30 provided so as to move in the vertical direction by the guide of the guide rods 22, a vertically driving means 40 for reciprocatingly moving the slider member 30, and a biasing force control means for controlling the degree to press the support plates 10 by the operation of a user.

The support plates 10 is, as shown in FIG. 1, made from a synthetic resin material which has excellent elasticity and provided with a plurality of support wings 12 at both sides, wherein fixing hooks 13 in the shape of a hook are formed at the upper portion of the rear surface thereof.

The support plates 10 as above have through holes penetrated in the shape of a rectangle in the center and both side portions. The support wings 12 provided at both sides of the support plates 10 are formed to be slightly larger than the support wings 12 provided in the center of the support plates 10. The support wings 12 are provided at an interval so as to increase the elasticity.

Further, the fixing hooks 13 which are formed at the upper portions of the rear surface are formed in the shape of a hook such that the fixing hooks 13 are prevented from being separated from the horizontal support rod 21 of the support frame 20 in the state that the fixing hooks 13 are fitted on the horizontal support rod 21 of the support frame 20 as described below.

The support frame 20 is formed by folding a metal rod and coupled to the rear surface of the support plates 10, and has the support rod 21 which horizontally extends at the upper portion thereof and the guide rods 22 which are in parallel to each other and connected to the support rod 21 in the vertical direction.

The slider member 30 has a spiral hole 31 formed in the center of the body part thereof and is provided to be slidable along the guide of the guide rods 22 in the state that the slider member 30 is screw-coupled to the screw 42 of the vertically driving means 40.

As for the operations of the slider member 30, the screw 42 rotates by the driving motor 41 which rotates in the clockwise direction or the counterclockwise direction according to a signal by the selection of a user such that the slider member 30 carries out sliding motion in the vertical direction according to the rotation direction of the driving motor 41.

Meanwhile, the vertically driving means 40 preferably includes a worm gear 43 and a worm gear 44 which are engaged with each other and provided to the screw 42 of the driving motor 41 so as to obtain a deceleration ratio as desired.

Further, the vertically driving means 40 is provided with a hall sensor (not shown) for sensing the rotation number of the driving shaft of the driving motor 41 and a motor control circuit for stopping the operation of the driving motor 41 as the rotation number of the driving shaft of the driving motor 41 reaches a preset rotation number.

In addition, the biasing force control means is positioned between the support plates 10 and the support frame 20 so as to control the degree to press the support plates 10 by the operation of the user.

The biasing force control means according to the present invention includes an upper member 50 which is hinge-coupled to the slider member 30, a lower member 60 which is guided to move in contact with the guide rods 22 of the support frame 20, coil springs 70 which are fixed to the upper member 50 and the lower member 60 by respectively fitting the both end portions into the upper member 50 and the lower member 60, a shaft 72 which is inserted into the coil portions of the coil springs 70, and an actuator 80, wherein a wire 81 which is held by the upper member 50 by passing through an insertion hole 42a of the lower member 60 is pulled or released such that the coil portions in the center of the coil springs press the support plates 10.

At this time, rollers 73 are fitted between the coil springs 70 at both sides of the shaft 72 so as to reduce the frictional resistance when the support plates 10 are pressed.

The operations of the biasing force control means according to the present invention structured as above will now be described in reference with FIG. 4 to FIG. 7.

First, a user who seats in the driver's seat or the passenger's seat operates an operation part (not shown) for the control of the lumbar support, an operation signal is transmitted to a controller (not shown) such that power is supplied to the driving motor 41 via the controller.

As the screw 42 rotates by the power of the driving motor 41, the slider member 30 which is coupled to the spiral hole 31 lifts or lowers in the vertical direction by the screw 42.

At this time, the slider member 30 is hinge-coupled to the upper member 50 and the upper member 50 is connected to the lower member 60 through the one pair of coil springs, such that the above constituent elements move together in the vertical direction.

In this way, the pressing position of the support plates 10 can be controlled in the vertical direction.

Further, the degree for pressing the support plates 10 is determined by the biasing force control means.

As the user manipulates a switch in order to operate the biasing force control means in the case of automatic power control, the actuator 80 pulls or releases the wire 81.

In addition, the wire 81 can be pulled or released if the user rotates a lever in a desired direction in the case of manual control.

The end portion 81 of the wire 81 is held by a holding hook 82 on the upper member 50 which is hinge-coupled to the slider member 30.

Hinge parts 32 are formed at both end portions of the slider member 30 so as to surround the hinge shafts 51 which are formed at both ends of the upper member 50.

Figure 7:
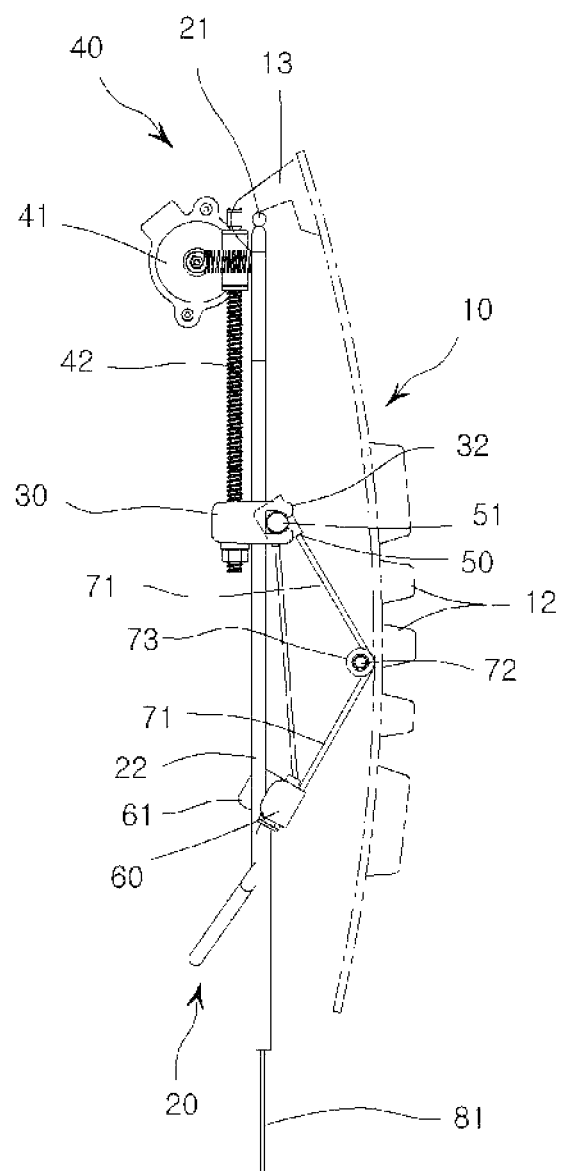
FIG. 7 is a side view showing a state after that the support plates are pressed according to the present invention.

Therefore, the slider member 30 is placed in position in the state that the slider member 30 and the upper member 50 are lifted or lowered together, and the upper member 50 can rotate at an inclination together with the coil springs 70 with respect to the hinge shafts 51 as shown in FIG. 7.

Further, the both end portions 71 of the coil springs 70 are fitted between the upper member 50 and the lower member 60. Therefore, the distance between the upper member 50 and the lower member 60 decreases as the wire 81 is pulled such that the coil portions which are positioned in the centers of the coil springs 70 protrude forwards and press the support plates 10.

Therefore, a press part which comes in contact with the support plates is supported by the coil springs 70 so as to maintain the elasticity of the springs. Thus, the support plates which support the body of the driver can be applied with elasticity and absorb shocks so as to more safely protect the driver even in the case of a collision during driving.

At this time, the coil springs 70 have elasticity such that the both end portions 71 of the coil springs 70 are maintained in a straight line in the free state of the coil springs 70 and the coil springs 70 are restored to the straight line state if tension is applied thereto while the center coil portions protrude forwards by the wire 81.

At this time, it is preferable to provide the rollers 73 between the coil springs 70 at both sides of the shaft 72 by fitting so as to reduce the frictional resistance which is applied when the support plates 10 are pressed.

Further, it is preferable to respectively provide guide protrusions 61 at both sides of the lower member 60 so as to prevent the lateral movement of the lower member 60 when the lower member 60 moves along the guide rods 22 in the vertical direction.

Figure 6:
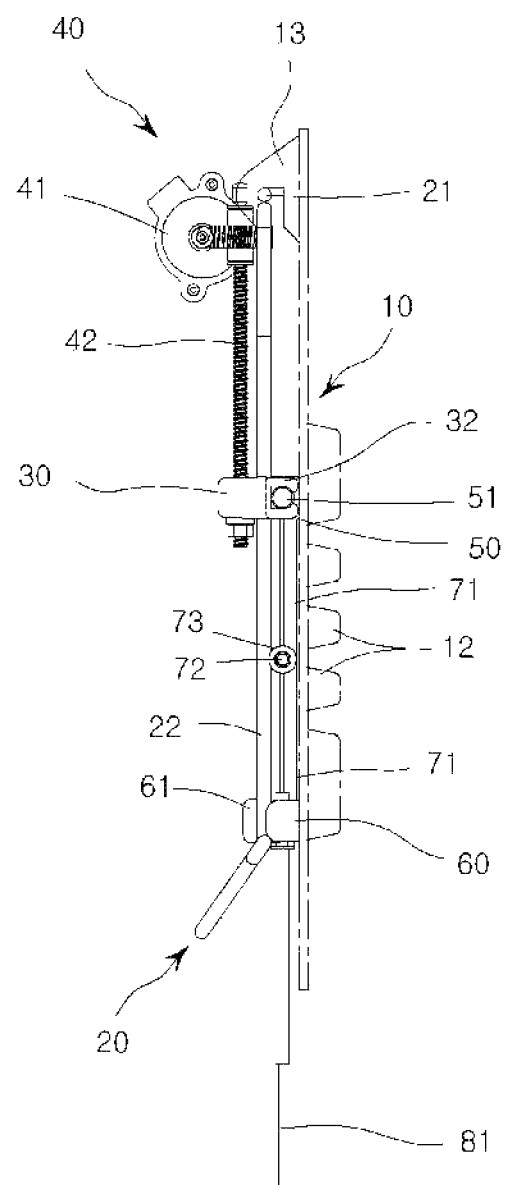
FIG. 6 is a side view showing a state before that the support plates are pressed according to the present invention.

If the user operates the actuator 80 so as to release the wire 81, the support plates which have protruded towards the lumbar vertebra region are restored as shown in FIG. 6, and the pressing degree can be controlled by stopping the operation at a desired position.

Therefore, the lumbar support according to the present invention can stably and comfortably support the protruding motion of the support plates 10 and absorb the shock at the time of a vehicle collision, thereby safely protecting the driver.

The embodiments described above are to be understood as a few illustrative examples of the present invention and the invention is not to be limited by any of the embodiments and drawings of the description. It will be understood by those skilled in the art that various modifications, combinations and changes may be made to the embodiments without departing from the scope of the present invention.

What is claimed is:

1. A lumbar support of a car seat, comprising:
   support plates made from a synthetic resin material in the shape of a plate and having a plurality of support wings at both sides and fixing hooks on top of the rear surface thereof;
   support frame positioned at the rear portions of the support plates and having a support rod engaged with the fixing hooks and a pair of guide rods connected to the support rod in parallel to each other;

slider member provided to move in the vertical direction by the guide of the guide rods and having a spiral hole formed in the center thereof;

vertically driving means having a driving motor driven by an external input signal and a screw which is coupled in the spiral hole of the slider member so as to move the slider member by the operation of the driving motor; and a biasing force control means positioned between the support plates and the support frame and controlling the pressing degree of the support plates according to the operation of a user, wherein the biasing force control means includes;

an upper member coupled to the slider member;

a lower member guided to move in contact with the guide rods of the support frame; and coil springs having both end portions which are respectively fitted and fixed into the upper member and the lower member and a shaft fitted into a coil portion in the center thereof;

wherein a wire which passes through an insertion hole of the lower member so as to be held by the upper member is pulled and released by an actuator such that the central coil portion of the coil springs presses the support plates.

2. The lumbar support of a car seat according to claim 1, wherein rollers are mounted on the shaft by being fitted between the coil springs at both sides of the shaft.

3. The lumbar support of a car seat according to claim 1, wherein hinge parts are formed at both end portions of the slider member so as to surround hinge shafts which are formed at both ends of the upper member, and guide protrusions are respectively formed by protruding from the both sides of the lower member so as to prevent the movement of the lower member in the right and left directions when the lower member moves in the vertical direction along the guide of the guide rods.

4. A lumbar support of a car seat comprising:

a support plate to support user's back and made of elastic material;

a support frame to which the support plate is rotatably engaged;

a slider member mounted on the support frame in a movable manner in a vertical direction;

a vertically driving means to move the slider member on the support frame;

a biasing force control means including an upper member moving together with the slider member, a lower member disposed below the upper member, a biasing member connecting the upper and lower members to each other and having a controllable biasing force acting on the support plate depending on a distance between the upper and lower members, and an actuating means to control the distance between the upper member and the lower member;

wherein each end of the biasing member is respectively engaged to the upper member and the lower member;

wherein the biasing member is configured to be protruded toward the support plate as the distance between the upper member and the lower member decreases;

and wherein the biasing member includes:

coil springs extended between the upper member and the lower member; and a shaft inserted into the coil springs.

5. The lumbar support of a car seat according to claim 4, wherein fixing hooks are formed in one end of the support plate which is hingedly engaged to the support frame.

6. The lumbar support of a car seat according to claim 5, wherein the support frame includes:

a supporting member to which the fixing hooks are engaged; and a pair of guides rod fixed to the supporting member.

7. The lumbar support of a car seat according to claim 4, wherein the slider member is guided by a pair of guide rods provided to the support frame, and the vertically driving means is fixed to the support frame.

8. The lumbar support of a car seat according to claim 7, wherein the vertically driving means includes:

a driving motor;

a screw driven by the driving motor and engaged with the slider member via a threaded hole formed in the slider member.

9. The lumbar support of a car seat according to claim 4, the biasing member includes a pair of coil springs and the shaft is inserted into both of the pair of coil springs.

10. The lumbar support of a car seat according to claim 9, the actuating means includes:

a wire engaged to the upper member through the lower member; and an actuator pulling or releasing the wire such that the central coil portion of the coil springs presses the support plate.

* * * * *